United States Patent [19]

Sidlauskas

[11] Patent Number: 4,736,203

[45] Date of Patent: Apr. 5, 1988

[54] 3D HAND PROFILE IDENTIFICATION APPARATUS

[75] Inventor: David P. Sidlauskas, San Jose, Calif.

[73] Assignee: Recognition Systems, Inc., San Jose, Calif.

[21] Appl. No.: 756,390

[22] Filed: Jul. 17, 1985

[51] Int. Cl.$^4$ .............................................. H04Q 1/00
[52] U.S. Cl. ................................... 340/825.34; 382/2
[58] Field of Search ....................... 340/825.3–825.34; 382/1, 2, 4, 5, 9, 10, 16, 28, 58, 69

[56] References Cited

U.S. PATENT DOCUMENTS

| | | | |
|---|---|---|---|
| 3,648,240 | 3/1972 | Jacoby et al. | 382/2 |
| 3,882,462 | 5/1975 | McMahon | 382/4 |
| 3,968,476 | 7/1976 | McMahon | 382/4 |
| 3,975,711 | 5/1976 | McMahon | 382/4 |
| 4,206,441 | 6/1980 | Kondo | 340/825.34 |
| 4,537,484 | 8/1985 | Fowler et al. | 382/4 X |
| 4,573,193 | 2/1986 | Shuto et al. | 382/2 |

OTHER PUBLICATIONS

J. R. Young et al., "Automatic Palmprint Verification Study", Rome Air Development Center, Griffiss AF Base, New York, 13441, Jun. 1981.

P. A. Devijber et al., "Pattern Recognition, A Statistical Approach", Prentice-Hall, 1982.

IECON/84, Yoshikawa and Ikebata, A Microcomputer-Based Personal Identification System, 10/22/84.

IBM Technical Disclosure Bulletin, vol. 25, No. 4, Sep. 1982, Low Cost Personal Identification Verification Device Based on Finger Dimensions–J. Svigals; IBM Corp., 1982.

RADC-TR-81-161 Final Technical Report, Jun. 1981; Automatic Palmprint Verification Study: SRI International; Young & Hammon.

Primary Examiner—Ulysses Weldon
Attorney, Agent, or Firm—Fliesler, Dubb, Meyer & Lovejoy

[57] ABSTRACT

An identification system is disclosed which determines whether the claimed identity of an individual is in fact the true identity. A three dimensional image of a hand is obtained using a digitizing camera and a pair of orthogonal reflecting surfaces. The image is then compared with a previously recorded hand image for the claimed identity. If the images match, within a selectable tolerance, the person is accepted as the correct individual. If they do not match, the person is rejected. Signalling and/or control apparatus responds to the results of the comparison.

8 Claims, 4 Drawing Sheets

3D HAND PROFILE IDENTIFICATION APPARATUS

BACKGROUND OF THE INVENTION

1. Field of the Invention

This invention relates to identification devices, security locks and keys, and access control systems. More particularly, it relates to an identification apparatus which measures hand dimensions and relations thereof for the purpose of identification.

2. Description of Prior Art

In the past, keys of both a mechanical and electrical nature have been used to restrict access to authorized individuals. The controlled access may be to physical areas, such as with the common lock and key, or to information, such as with computer terminal passwords, or to valuables, such as with automatic bank teller personal identification codes. The problem in these types of system is that access is provided to any keyholder, and the keys are transferable and easily lost, stolen or passed on.

More recently, identification devices relying upon biometric characteristics unique to an individual have been proposed. These devices measure and compare such things as voice, fingerprints, finger lengths, and signatures. They all suffer in performance because the characteristic of the person that is measured tends to vary greatly even for a given individual. For example, a person's fingerprints suffer day-to-day damage from scratches, abrasions and so on, that make accurate automatic identification very difficult. Also, they have proven to be very costly to manufacture because of such things as the precision required in the repeatable measurement of such fine detail as fingerprint minutia in fingerprint recognition systems, and high fidelity voice detection and background noise filtering in voice recognition systems.

It has been long known that people's hands differ in their size and shape, and that these differences can be used to distinguish one individual from another. Many goemetric characteristics of the hand can be measured and used to distinguish identity. For example, measurements such as length width, area, perimeter, thickness and so on, are unique to an individual. Also, combinations of these measurements, such as the ratio of length to width, can be used with good effect as identity discriminants.

Identification devices relying upon measurements of the large detail of the hand have been used with some success. However, these devices simply utilize the single dimensional measurement of finger lengths as an identity discriminating characteristic, and this does not present enough information for highly reliable identity determination.

Very recently, systems have been proposed which utilize two-dimensional pictures of the hand outline as acquired with an electronic digitizing camera. These systems have much better performance than those that rely simply upon finger length measurements. However, they are easily defeated by the use of an artifact in the shape of the hand of the claimed identity. Since only a simple two dimensional shadow image is required, such an artifact is easily constructed from a cardboard tracing of the hand of an authorized user. Such an outline can be obtained either surreptitiously, or through the cooperation of the authorized user.

SUMMARY OF THE INVENTION

A system is disclosed consisting of a digitizing camera, an optical measuring platen which provides to the camera both a plan view and a side view of an object placed thereon, image processing means, and results signaling means.

In operation, the claimed identity code is entered, typically using a pushbutton keypad. The hand is then placed upon the measuring platen, and a three dimensional view of the hand, consisting of the plan view and side view, is acquired by the digitizing camera. The image is analyzed to extract features such as finger lengths, and widths, hand thickness, area and perimeter, and so on. These features are then compared with previously acquired and stored features to determine if the claimed identity is in fact the true identity.

With this invention, the identity of an individual is distinguished by using a three dimensional measurement made from two views of the hand; a plan view and a side view. The use of three-dimensional hand information provides greater identity discrimination capability, and makes defeat with an artifact very difficult, as now an artifact exact in three dimensions is required.

BRIEF DESCRIPTION OF THE DRAWINGS

The above and other objects of the present invention will become apparent from the following detailed description of the accompanying drawings in which.

DESCRIPTION OF THE PREFERRED EMBODIMENT

Figure 1:
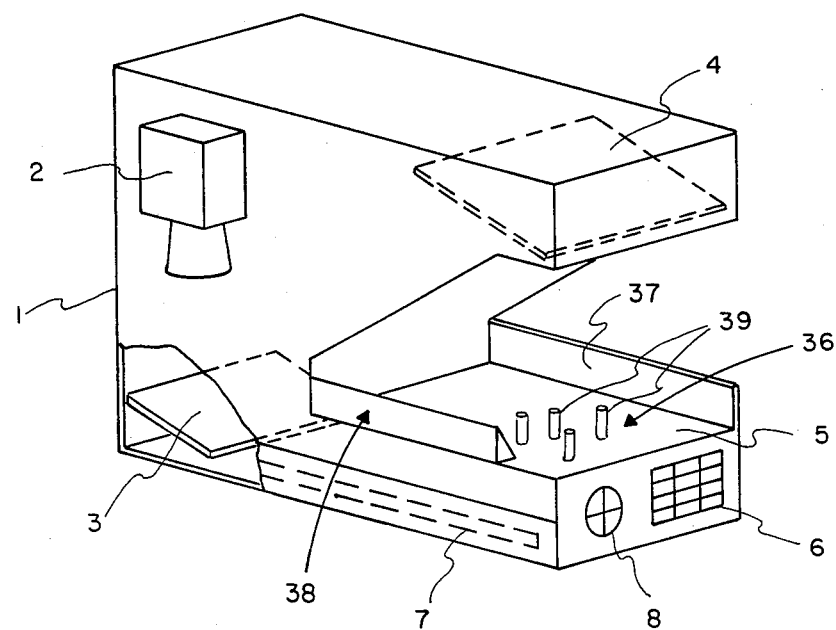
FIG. 1 is a perspective view of a device embodying the present invention.

FIG. 1 illustrates an embodiment of the invention. The construction includes an overall enclosure 1 which houses a digitizing camera 2, optical beam reflecting mirrors 3 and 4, a hand measuring platen 5, a keypad or other means 6 for entering an identity code, suitable control and processing electronics 7 and a comparison results indicating lamp 8. The camera 2 and the mirrors 3 and 4 are positioned within the enclosure 1 such that the camera has a full view of the measuring platen 5.

Figure 2:
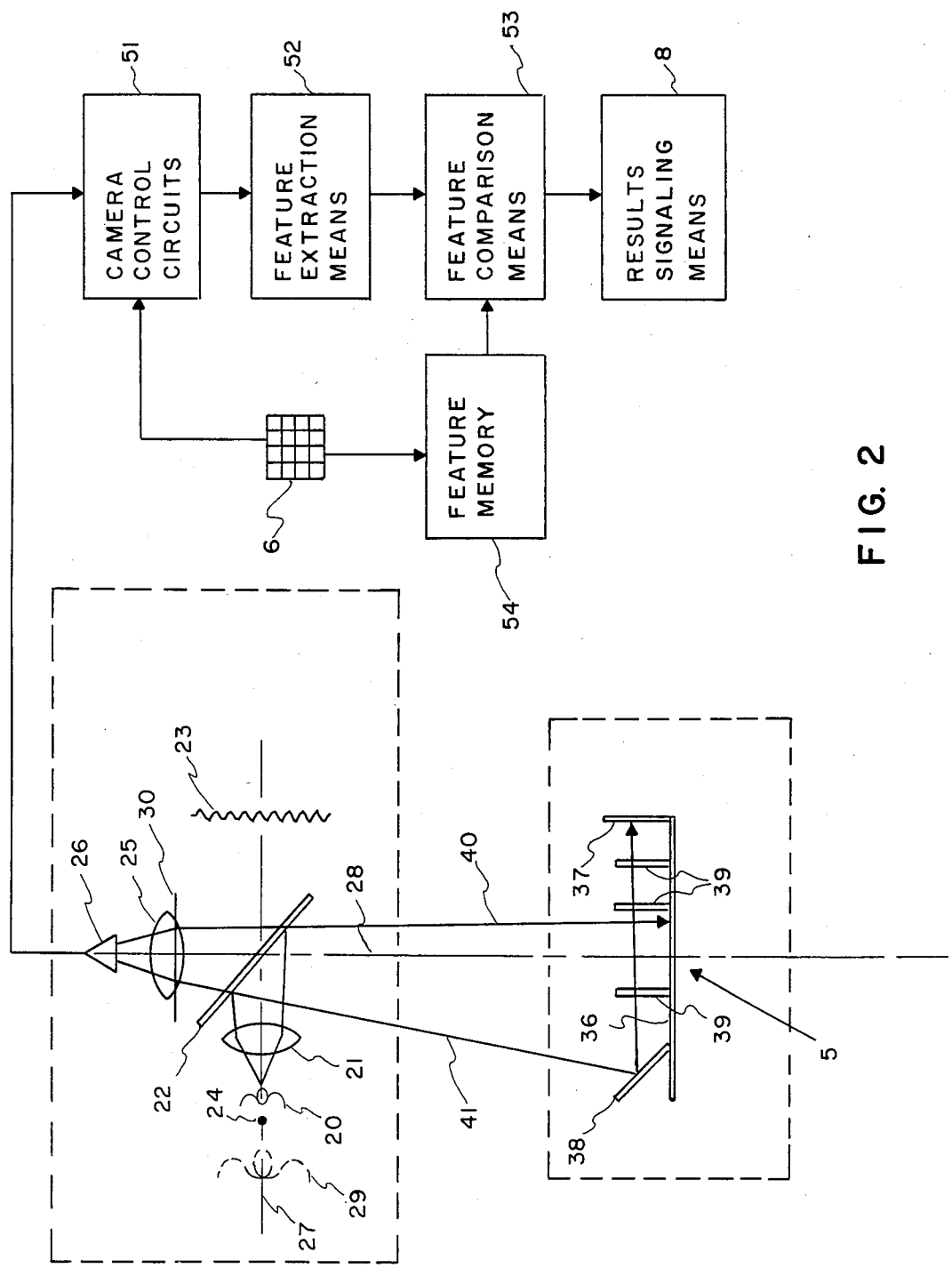
FIG. 2 is a schematic diagram of the present invention.

A more detailed schematic drawing of the system is shown in FIG. 2. Absent from this figure are the mirrors 3 and 4, as their only purpose is to bend the optical beam to fit the confines of the enclosure 1, and serve no other functional purpose.

In FIG. 2 is shown, as elements of the digitizing camera 2, a light source 20 which is typically an incandescent lamp bulb, but may be any source of suitable radiation such as a light emitting diode or laser, a condensing lens 21, an optical beam splitter 22, an optical absorber 23, a camera imaging lens 25, and an image detecting array 26.

The light source 20 and condensing lens 21 are positioned so that the illumination optical axis 27 is perpendicular to the image optical axis 28 of the imaging array 26 and imaging lens 25. The beam splitter 22 is located with its center at the intersection of the two said optical axes, and at an angle of 45° with respect to the illumination axis 27 and image axis 28. A beam splitter that reflects 50% of the light and transmits 50% is preferred, but variance from this ratio is acceptable over a wide range.

The condensing lens 21 is optional, its only function being to increase the optical efficiency of the system by more effectively gathering light from the source 20. If the lens 21 is used, the source 20 must be positioned inside of the focal point 24 of the lens 21, thus forming a virtual image 29 of the source 20 which is located behind the source 20. The distance from the virtual image 29, if the lens 21 is used, or the distance from the source 20 itself if the lens 21 is not used, to the central point of the beam splitter 22 must be the same as the distance from the front principal plane 30 of the imaging lens 25 to the same said central point on the beam splitter 22. The purpose of this is to maintain the light source-to-object and camera-to-object distance equal.

The condensing lens 21 and imaging lens 25 are positioned as close to the beam splitter 22 as is reasonably practical, consistent with the equal distance specification above. The image sensing array 26 is centered on the image optical axis 28 and located along this axis at a position behind imaging lens 25 which brings the image of objects located on the measuring platen 5 into sharp focus on the surface of the image sensing array 26.

The optical absorber 23 is positioned on the illumination axis 27 on the opposite side of the beam splitter from the light source 20.

The measuring platen 5 is positioned so that it is centered along the optical axis 28 of the digitizing camera 2, and located at a distance from the camera 2 such that the measuring area of the platen 5 completely fills the field of view of the imaging array 26. This distance will depend upon the focal length of the imaging lens 25 and the size of the imaging array 26, and is on the order of 30 inches.

Figure 3A:
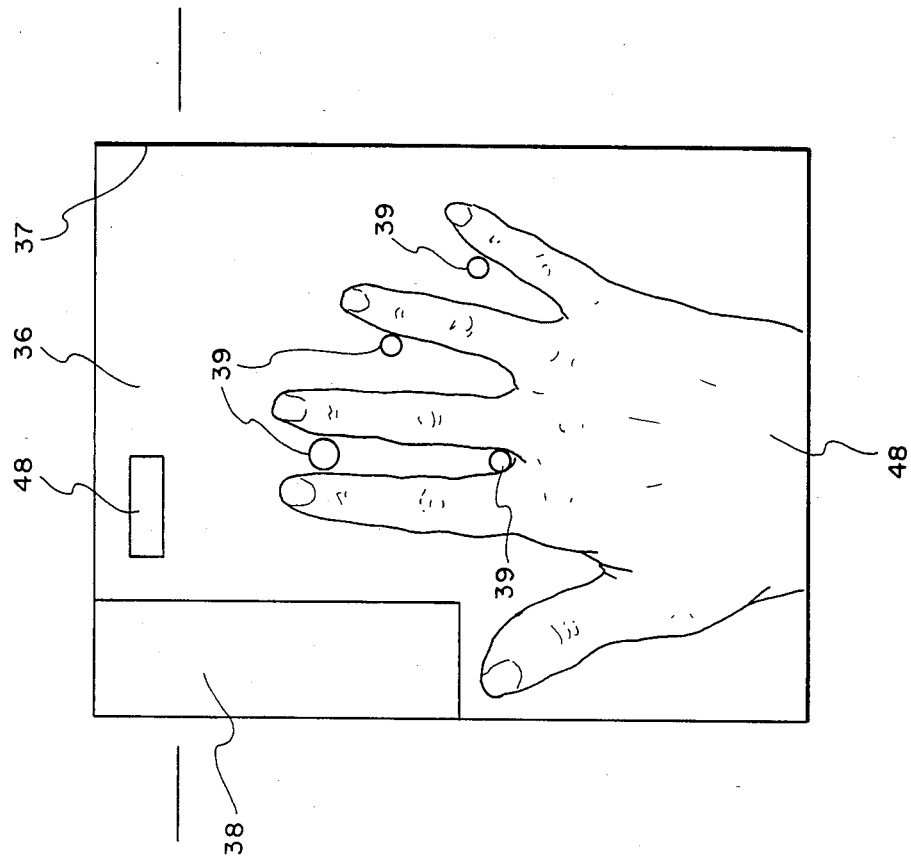
FIG. 3A is a detail plan view of a measuring platen according to the present invention.

Referring to FIG. 3A, the measuring platen 5 comprises a first measuring surface 36 and second measuring surface 37 located at right angles to each other. These measuring surfaces are constructed from an optically retro-reflective material as will be described in more detail below. The first measuring surface 36 is of a size sufficient to accept the plam and fingers of a hand, on the order of 6½ inches square. The second measuring surface 37 is at least as high as the thickness of any hand, and extends for substantially the length of the first measuring surface.

A plane mirror 38 is mounted to the first measuring surface 36 on the side opposite from the second measuring surface 37 and facing the second measuring surface but tilted at an angle of 45° to both the first measuring surface 36 and the optical axis 28 of the digitizing camera.

Mounted perpendicular to the first measuring surface 36 are several round finger positioning posts 39.

Figure 3B:
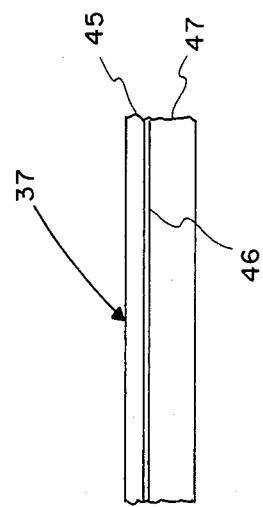
FIG. 3B is a partial cross-sectional view of the measuring platen of FIG. 3A.

The optical measuring platen 5 is shown in greater detail in FIG. 3B. FIG. 3B shows a cross section of the platen measuring surfaces 36 and 37. Since both surfaces 36 and 37 are fabricated in an identical manner, only one of them, i.e. surface 37, is described in detail. Accordingly, it should be noted that the measuring surface 37 is constructed of an optically clear glass or plastic protective cover 45, which covers a retro-reflective sheeting material 46 which is attached to a supporting backplate 47.

The retro-reflective sheeting material 46 is a commercially available material that is commonly used in road signs, reflective clothing for night workers, etc. The sheeting is constructed by bonding microscopic glass spheres to a supporting substrate. The glass spheres are naturally retro-reflective, and in the aggregate, produce a retro-reflective sheet.

Referring again to FIG. 3A, there is shown a plan view of the measuring platen 5 with a hand 48 in place. Also shown on this view are the platen mirror 38, finger positioning pins 39, the second measuring surface 37, and a calibration reference target 48.

The calibration reference target 48 is an area devoid of retro-reflective material, and is of a precisely known size, and located at a precisely known position with respect to the finger locating pins 39, such position being outside of the field occupied by a hand located in the measurement position, but within the field of view of the digitizing camera 2.

Once again referring to FIG. 2, also shown are the identification code entry means 6. In the preferred embodiment, this is a numeric keypad, but may also be a magnetic stripe or other card reader, computer terminal or any such device suitable for entry of a simple identification number.

Further shown on FIG. 2 are the camera control circuit 51, feature extraction means 52, feature comparison means 53, feature memory 54, and results signaling means 55.

The feature extraction means 52 and feature comparison means 53 typically comprise a computer program. The feature memory 54 may be local to the remainder of the system, or located remotely, as at some central host computer serving a number of identification stations, or even included as part of an identification card carried by the user.

The results signaling means 55 comprises an indicating lamp or door lock, activation circuit to a computer data line, or whatever is required by the particular application.

In operation, the hand is placed on the measuring platen 5 in substantially the position shown in FIG. 3A. The user's personal identification code is then entered using the code entry means 6.

Referring again to FIG. 2, light from the source 20 is collected by the condensing lens 21 and directed towards the beam splitter 22. The beam splitter 22 has the property that it reflects half of the light striking it and transmits the other half.

The light from lens 21 transmitted through the beam splitter 22 is captured by the optical absorber 23 and not further used. The purpose of the optical absorber 23 is to remove unwanted light, preventing any bad effect due to stray light reflections.

The light from lens 21 reflected downward by the beam splitter is directed towards the measuring platen 5 and the retro-reflective sheeting 46.

The retro-reflective sheeting 46 has the property of reflecting light rays directly back along the path from which they came. Consequently, light from a source, for example ray 40, striking the retro-reflective material is reflected directly back towards the source. In this case, ray 40 is reflected directly back along the path from which it came, whereupon it again strikes the beam splitter 22. Half of the light of ray 40 is reflected back to the source 20, and the other half of the ray 40 is transmitted by the beam splitter 22, collected by the imaging lens 25 and focused onto the imaging array 26.

Had the ray 40 been blocked by the presence of a part of the hand, it would have been scattered in all directions, only a small portion being returned to the imaging array. Thus, an object on the platen appears dark to the digitizing camera against the very bright background of the retro-reflective measuring surfaces 36 and 37.

The use of retro-reflective materials is of particular advantage in a system, such as that of the present invention, where a high contrast shadow image is required. As described above, light striking the material is reflected back in the direction from which it came. This reflection occurs with a minimum of scattering, with almost all of the retro-reflected light contained in a cone less than 1° wide.

When illuminated and viewed using a coaxial illumination and viewing axis, so that the illumination and viewing axis are at the same angles with respect to the retro-reflective surface, such as is the case in the present invention, most of the light from the source is returned by the retro-reflective material to the viewer. For example, Scotchlight type 1610 retro-reflective material returns 1600 times more light to the viewer, in such a system, than does a piece of pure white paper. Consequently, the retro-reflective material appears as a very bright background. An object, such as a piece of white paper or a hand, will appear black when viewed against the bright retro-reflective background providing a very high contrast shadow image which is required for accurate dimensional measurements.

Other types of retro-reflective platens can also be fabricated. For example, a large fresnel lens and plane mirror can be used in place of the retro-reflective sheeting. In this method, the fresnel lens is placed directly over the plane mirror. The surface of the fresnel lens is used as the platen surface. The coaxial illumination and viewing axis must be aligned with the axis of the fresnel lens, and the focal length of the fresnel lens must be such that the source and entrance aperture of the imaging lens are both located in the focal plane of the fresnel lens. Similarly, the fresnel lens and mirror can be replaced by a spherical or parabolic mirror to achieve the same result.

Referring again to FIG. 2, another part of the light deflected downward by the beam splitter towards the platen, for example ray 41, strikes the platen mirror 38. This mirror is placed at an angle of 45° to the platen surface, and thus reflects the light striking it across the platen to where it strikes the vertically placed second measuring surface 37. From this surface the light is retro-reflected back along the path from which it came until, as before, it is collected by the lens 25 and focused onto the imaging array 26. Rays blocked in their travel across the platen from mirror 38 to the second measuring surface 37 are scattered and not returned to the imaging array. Thus, the portion of the field of view of the digitizing camera encompassing the platen mirror 38 provides a side view of any object on the platen.

The use of the mirror 38 and the second retro-reflective measuring surface 37 is very important to the purposes of this invention. This simple low cost addition provides at once an important increase in performance and function because it makes easily available a side view of, and in addition to, the plan view.

The side view of the hand contains additional identity discriminating information such as average thickness, slope of thickness with respect to length, thickness at particular points of the hand and so on. Additionally, the use of this side view requires that any artifact that is used in an attempt to defeat the system be correct in all three dimensions rather than be simply a two-dimensional cutout as can be used to defeat devices of the prior art.

As shown on FIG. 3A, the retro-reflective platen contains a calibration reference mark 48 on its surface. This mark is a precisely located area devoid of retro-reflective material, and thus appears black in the detected image. It is used as a dimension calibration reference mark from which hand outline measurements are referenced. The use of the calibration mark 48 frees the system from requirements for rigid and stable alignment between the digitizing camera 2 and the measuring platen 5.

The light returned from the platen 5 and focused by imaging lens 25 onto the image detecting array 26 will form a shadow image of any object located on the platen. Since the object blocks light rays traveling from the light source to the retro-reflective measuring surfaces 36 and 37 of the platen, the object will appear to the camera dark against the very bright background of the platen. The side view of the hand appears in that portion of the field of view of the camera encompassing the platen mirror 38. The plan view of the hand occupies the remainder of the image field.

The imaging array is preferably an Optic Ram such as the IS-32 manufactured by Micron Technology. This type of imaging array is derived from a dynamic random access computer memory chip by mounting the chip in a package with a clear window, so that an image can be focused onto the chip.

This type of memory device contains a small integrated capacitor as the storage element for each memory cell. If the capacitor is charged, the memory cell represents a logical 1 state, and if discharged, a logical 0 state. Refresh circuits on the memory chip periodically sample the state of each memory cell and restore the charge to a charged or discharged level depending upon the state. This refresh operation prevents the memory cells from inadvertently changing state due to incidental charge gain or loss of their storage capacitor.

With an optical image focused onto the memory chip, photons which enter the silicon create free electrons which are available to charge the memory cell capacitors towards their 1 state. The normal application of the periodic refresh signal prevents this.

In order to record an image, the memory cells are all first initialized to their 0 charge state. Then periodic refresh signal is suspended for a period of time analogous to the exposure time in normal photography. During this time, photons from the focused image create free electrons which tend to charge the storage cell capacitors. In regions where the image is brightest, the capacitors will receive the most charge. When the exposure time has elapsed, the refresh signal is reapplied. Now, by virtue of the operation of the refresh function, cells that have received sufficient charge to change their logical state will be fully charged, while those that have not will be fully discharged. The periodic refresh will function to maintain this new state of the memory cells.

The memory cells located in bright portions of the image will now have been set to a logical 1, while those in the darker portions of the image remain a logical 0. Thus, the bit pattern of the memory chip is now a representation of the image focused thereon, and can be read out at any time.

This type of image recording chip is very advantageous for applications such as that of the present invention. First, it is very inexpensive. Second, since it is a computer memory chip, it interfaces very easily and inexpensively to a microcomputer processing system. Third, it provides its own image storage capacity.

It should be clear, however, that the present invention does not require the use of such an imaging array. Any electronic camera that is capable of capturing an image of the hand is suitable.

Figure 4:
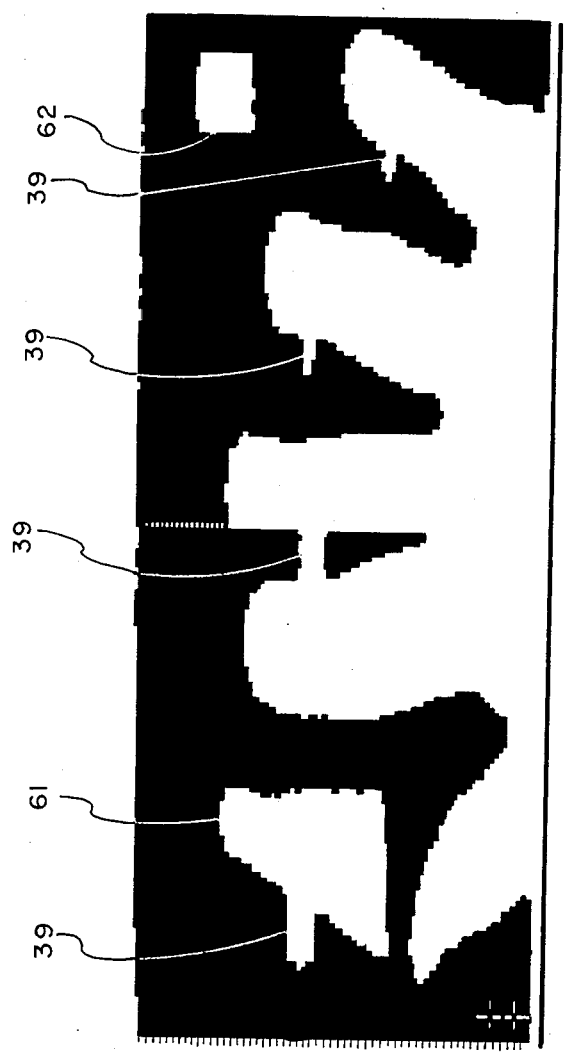
FIG. 4 is a typical hand picture acquired by the camera.

The entry of the identification code using the keypad 6 triggers the camera control circuits to acquire an image of the hand as described above. A typical image is shown in FIG. 4. Here is seen the hand plan view image 60, the side view image 61, and the calibration reference mark 62. Because of the process used to print the image, it is shown in reverse color; that is, black is shown as white and white as black. Also, because of the difference in aspect ratio printing process between the printing process and the imaging array, the printed image is compressed in the dimension along the fingers.

The feature extracting means 52 operates upon the acquired image to extract the identity discriminating features from the acquired image. Typically, features such as length, width, area and perimeter are used, as are relationships among these features, such as the ratio of area to perimeter.

In calculating the particular feature values, the platen calibration reference mark 48 is used as a physical reference point. The locations of any points on the hand images 60 and 61 are determined with respect to the calibration reference mark image 62, rather than being taken absolutely with regard to their position on the image.

The use of the calibration reference mark 48 in this manner frees the system from any strict requirement for positional stability between the digitizing camera 2 and the platen 5. Any movement of the digitizing camera 2 with respect to the platen 35 will cause a shift of the position of the hand images 60 and 61, but will also cause a corresponding shift in the position of the calibration reference mark image 62. The relationship between the reference mark image 62 and hand images 60 and 61 is unaffected by such a camera-to-platen misalignment.

The comparison means 53 functions to compare the extracted hand features with previously stored features. The stored features are retrieved from the feature memory 54 using the identification code entered via keypad 6.

The results of the comparison between the stored and measured features are then passed to the results signaling means 8. If a desired correspondence is obtained, the results are visually indicated and/or used to open a door, gain access to a data base, or the like.

While a preferred embodiment of the present invention is described and several modifications thereto suggested, it is contemplated that still other modifications may be made to the embodiments described and suggested without departing from the spirit and scope of the present invention. Accordingly, it is intended that the embodiments described be considered only as illustrating the invention and that the scope thereof be determined by the claims hereafter provided.

What is claimed is:

1. An identification apparatus comprising:
    means responsive to retro-reflected radiation;
    a pair of orthogonally orientated retro-reflective surfaces in front of which a person's hand may be placed for retro-reflecting incident radiation from a source of radiation which is not interrupted by said hand for projecting a single image comprising a plan and profile view of said person's hand to said retro-reflected radiation responsive means;
    means in said retro-reflected radiation responsive means which is responsive to said image for providing signals corresponding to said plan and profile views;
    means responsive to said signals for providing current measurement data from said plan and profile views;
    means for comparing said current measurement data with data previously stored in a memory; and
    means for providing a signal when said current measurement data and said previously stored data match within a predetermined tolerance.

2. An apparatus according to claim 1 wherein said incident and retro-reflected radiation are coaxial.

3. An apparatus according to claim 1 wherein at least one of said retro-reflective surfaces comprises a reference mark.

4. An apparatus according to claim 3 wherein said reference mark comprises a predetermined non-reflective area on said latter surface.

5. An identification apparatus comprising:
    a source of radiation;
    first and second orthogonally orientated retro-reflective surfaces for reflecting said radiation;
    means for propagating said radiation from said source along a first and a second axis perpendicular to said first and said second surfaces, respectively; and
    means responsive to the radiation reflected from each of said surfaces for providing signals corresponding to the intensity of said reflected radiation.

6. An apparatus according to claim 5 wherein the radiation incident on each of said surfaces and the radiation reflected therefrom are coaxial.

7. An apparatus according to claim 5 comprising:
    means for comparing said signals with data previously stored in a memory; and
    means for providing a signal when there is a predetermined correspondence between said signals and said previosly stored data.

8. An apparatus according to claim 5 wherein said propagating means comprises:
    a beam splitter for propagating said radiation from said source along said first axes to said first surface; and
    a plane mirror for propagating said radiation from said beam splitter to said second surface along said second axis.

* * * * *